Aug. 25, 1931.    I. DOROGI ET AL    1,820,124
RUBBER BALL
Filed Feb. 23, 1927
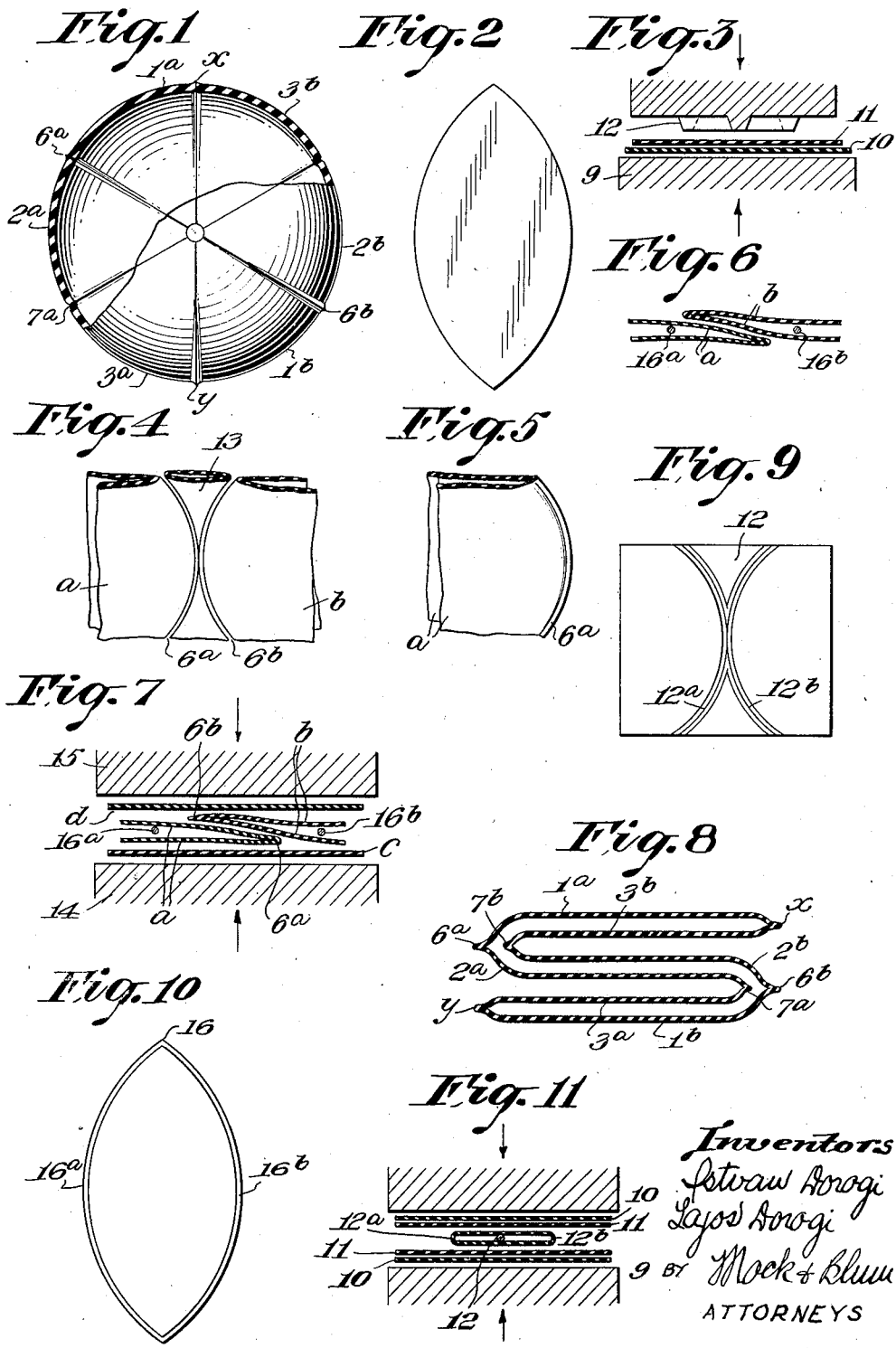

Patented Aug. 25, 1931

1,820,124

UNITED STATES PATENT OFFICE

ISTVÁN DOROGI AND LAJOS DOROGI, OF BUDAPEST, HUNGARY, ASSIGNORS TO DR. DOROGI ÉS TÁRSA GUMMIGYÁR R. T., OF BUDAPEST-ALBERTFALVA, HUNGARY, A LIMITED COMPANY

RUBBER BALL

Application filed February 23, 1927, Serial No. 170,280, and in Hungary August 28, 1926.

This invention relates to a rubber ball and to a method of manufacturing same.

The so-called inflatable rubber balls consisting of thin rubber sheets attached along meridian seams which collapse when no internal excess pressure is present, were hitherto generally produced by beating together the individual sheets confined by two intersecting arcs of a circle which may have a spherical shape. This method of production is however comparatively expensive. By cut seaming it was hitherto only possible to produce balls consisting only of four segments, which are however of a more or less oval, and not spherical shape, so that they could only be employed as linings particularly as football bladders.

The present invention relates to a construction and to a method of manufacturing inflatable rubber balls, which can be produced from six segments by cut seaming along the meridian seams and which consequently exhibit a perfectly spherical shape.

According to the invention it is important that the balls are composed of an arcuate pocket-shaped element having an externally convex seam or of a series of such elements.

In a preferable embodiment, the new ball consists of two equal halves united with each other by a cut seam with an outwardly turned edge, each of said halves consisting of an odd number particularly of three or five plane sections having the shape of a segment confined by two arcs, hereinafter briefly referred to as "lenticular segment", and are united together by cut seams with alternately inwardly and outwardly turned edges.

In order more clearly to understand the invention, reference is made to the accompanying drawings which illustrate by way of example various embodiments of the invention.

Fig. 1 shows a top view partly in section of a ball consisting of six segments in an inflated state.

The finished ball consists of a number of spherical lenticular segments which in a flat state have the shape, illustrated in Fig. 2 of a plane sheet confined by two intersecting arcs of a circle.

According to Fig. 1, three of each of the aforesaid spherical lenticular segments for instance the sections 1a, 2a, 3a are united together on the one hand and the sections 1b to 3b are united together on the other hand by means of the cut seams 6a, 7a, and 6b, 7b. The one group consisting of three segments 1a to 3a is united with the other group consisting of the segments 1b to 3b by cut seams x, y. In the most suitable embodiment of the six part ball (Fig. 1) the edges of the cut seams x, y are turned outwardly whilst the edges of the seams indicated by even reference numerals are turned outwardly and the edges of the seams indicated by odd numerals are turned inwardly.

According to the invention the balls are produced by means of, at the maximum, two cuttings in the hereinafter described manner:—

Two rubber sheets 10 and 11 are superimposed upon the base 9 (Fig. 3) and are cut out by cut seaming, for example with the blunt die 12. The die 12 is shown in plan in Fig. 9 and has the shape of two arcs of a circle 12a and 12b which are in contact at their outer periphery. The two rubber sheets 10 and 11 are thus cut in the manner shown in Fig. 4. The centre shaded part 13 is waste while the parts a and b each consist of two pieces joined together by the seams 6a and 6b respectively and forming the pocket-like elements intended for the second stamping operation. Fig. 5 shows such a pocket in perspective. As can be seen from this figure the pocket-shaped element is provided at its bottom with an outwardly convex seam 6a. If, as shown in Fig. 11, a die 12 acting on both sides of he shape shown in Fig. 3, is loosely inserted between each pair of rubber sheets 10, 11, four pocket-like elements of the kind shown in Fig. 5 are produced in one cutting operation. The second stamping operation is effected by means of the wire loop 16 shown in Fig. 10. For this purpose the pocket shaped elements a and b are inserted in such a manner into the wire loop 16 that the branch 16a of the wire loop 16 lies between the two lobes of the pocket a and the branch 16b of the wire loop between the two pieces of the pocket $b$. This condition is shown in cross-section in Fig. 6. A rubber sheet $c$ is next laid upon a base plate 14 Fig. 7 and this wire loop 16 surrounded by the two pockets $a$ and $b$ is laid thereupon. The whole is covered by a second rubber sheet $d$ and by a second plate 15 whereupon the two plates 14 and 15 are pressed together. During this pressing operation the two pockets $a$ and $b$ practically completely cover each other and the wire loop 16 cuts the rubber sheets and at its cutting edge joins the two pieces of the pocket $a$ on the one hand at the seam $y$ to the sheet $c$ and on the other hand at the seam $6a$ to the sheet $d$ and the two pieces of the pocket $b$ on the one hand at the seam $6b$ to the sheet $c$ and on the other hand at the seam $x$ to the sheet $d$. The loop 16 acts like a dull cutting edge which simultaneously cuts and welds the superposed rubber sheets. A hollow body is thus produced which has the cross-section illustrated in Fig. 8. As can be seen from Fig. 8 a hollow body produced in this manner consists of six parts corresponding to the six spherical lenticular segments of the balls represented in Fig. 1, the pocket $a$ furnishing the two sections $2a$ and $3a$ and the pocket $b$ the two sections $2b$ and $3b$ of the ball, while the sheet $c$ forms the section $1b$ and the sheet $d$ the section $1a$ of the ball.

Having now particularly described and ascertained the nature of our said invention and in what manner the same is to be performed, we declare that what we claim is:—

1. An inflatable rubber ball adapted to collapse in the absence of internal excess pressure and produced of plane rubber sheets by cut seams, in which each half consists of more than two spherical lenticular segments.

2. Inflatable rubber ball as set forth in claim 1, which consists of two equal halves united with each other by a cut seam with an outwardly turned edge each half comprising an odd number of lenticular segments having their cut seams arranged with alternately inwardly and outwardly directed edges.

3. Method of manufacturing an inflatable rubber ball comprising joining together arcuate pocket shaped elements each having an outwardly convexed bottom seam.

4. Method of manufacturing a six-part ball by stamping from unvulcanized rubber sheets by means of blunt welding dies in which two pocket-shaped elements having outwardly convexed bottoms are stamped from a pair of rubber sheets by arcuate cuts whereupon an arcuate branch of a wire loop welding die is interposed between the layers of said pocket shaped elements and the thus covered wire loop welding die is pressed between two additional rubber sheets.

5. A process for the manufacture of a six part ball from unvulcanized rubber sheets which comprises stamping two superposed rubber sheets and simultaneously uniting them along the line of stamping to form two pocket-shaped elements with outwardly convex seamed bottoms, placing one pocket-shaped element on top of the other with the free edges of one element adjacent to but spaced from the seamed bottom of the other element, and then uniting the free edges of said elements by cut seams to the adjoining sides of rubber sheets placed above and below said elements.

6. A process for the manufacture of a six part rubber ball as set out in claim 5 characterized by the fact that the free edges of said elements are united to the rubber sheets between which they are interposed by means of a double faced die having biconvex cutting edges which is inserted between the free edges of said elements.

In testimony whereof we affix our signatures.

ISTVÁN DOROGI.
LAJOS DOROGI.